US011868880B2

(12) United States Patent
Rangarajan et al.

(10) Patent No.: US 11,868,880 B2
(45) Date of Patent: Jan. 9, 2024

(54) MITIGATING COMMUNICATION BOTTLENECKS DURING PARAMETER EXCHANGE IN DATA-PARALLEL DNN TRAINING

(71) Applicant: Microsoft Technology Licensing, LLC, Redmond, WA (US)

(72) Inventors: Nikhil Devanur Rangarajan, Seattle, WA (US); Jorgen Thelin, Redmond, WA (US); Amar Phanishayee, Redmond, WA (US); Guanhua Wang, Redmond, WA (US); Shivaram Venkataraman, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1228 days.

(21) Appl. No.: 16/276,250

(22) Filed: Feb. 14, 2019

(65) Prior Publication Data

US 2020/0160171 A1    May 21, 2020

Related U.S. Application Data

(60) Provisional application No. 62/770,053, filed on Nov. 20, 2018.

(51) Int. Cl.
*G06N 3/08*    (2023.01)
*G06F 13/42*    (2006.01)
(Continued)

(52) U.S. Cl.
CPC ........... *G06N 3/08* (2013.01); *G06F 13/4221* (2013.01); *G06F 15/163* (2013.01); *G06N 3/02* (2013.01);
(Continued)

(58) Field of Classification Search
None
See application file for complete search history.

(56) References Cited

U.S. PATENT DOCUMENTS 10,587,534 B2 *  3/2020  Gray ....................... H04L 12/18
11,176,489 B1 * 11/2021  Smola ..................... G06F 9/547
(Continued)

OTHER PUBLICATIONS

Gabow, et al., "Packing Algorithms for Arborescences (and spanning trees) in Capacitated Graphs", In Journal of Mathematical Programming, vol. 82, Jun. 1998.
(Continued)

*Primary Examiner* — Umut Onat
(74) *Attorney, Agent, or Firm* — Newport IP, LLC; Jacob P. Rohwer

(57) ABSTRACT

An interconnect topology for communication between GPUs in a computing system is determined. A quantity of directed spanning trees are generated for transmitting data between the GPUs using the interconnect topology and packed. The directed spanning trees define the connections between GPUs that are to be utilized for the transmission and the amount of data to be transmitted on each connection. Program code is generated for implementing the data transfer defined by the directed spanning trees. When the program code is executed, the directed spanning trees are used to pipeline the transmission of chunks of data, such as model parameters used during data-parallel DNN training, between the GPUs. The program code can also determine an optimal chunk size for data to be transferred between the GPUs.

9 Claims, 12 Drawing Sheets

(51) Int. Cl.
G06N 3/02 (2006.01)
G06F 15/163 (2006.01)
(52) U.S. Cl.
CPC ........... G06F 2213/0026 (2013.01); G06F 2213/0062 (2013.01)

(56) References Cited

U.S. PATENT DOCUMENTS

| | | | | |
|---|---|---|---|---|
| 2002/0167898 | A1* | 11/2002 | Thang | H04L 45/22 370/216 |
| 2005/0063321 | A1 | 3/2005 | Imai | |
| 2009/0016355 | A1* | 1/2009 | Moyes | H04L 45/02 370/395.31 |
| 2011/0185328 | A1* | 7/2011 | Roy | G06F 30/39 716/122 |
| 2012/0236726 | A1* | 9/2012 | Shihada | H04L 47/10 370/237 |

OTHER PUBLICATIONS

Vandegeijn, R.A, "On Global Combine Operations", In Journal of Parallel and Distributed Computing, vol. 22, Issue 2, Aug. 1994, pp. 324-328.
"International Search Report and Written Opinion Issued in PCT Application No. PCT/US19/061060", dated Mar. 4, 2020, 10 Pages.
Pai, et al., "A Compiler for Throughput Optimization of Graph Algorithms on GPUs", In Proceedings of the ACM SIGPLAN International Conference on Object-Oriented Programming, Systems, Languages, and Applications, Oct. 19, 2016, 19 Pages.
"MPI: A Message Passing Interface", In Proceedings of the 1993 ACM/IEEE conference on Supercomputing, Dec. 1993, pp. 878-883.
"NVIDIA DGX-1 With Tesla V100 System Architecture", Retrieved from: http://images.nvidia.com/content/pdf/dgx1-v100-system-architecture-whitepaper.pdf, Retrieved Date: Jan. 21, 2020, 43 Pages.
"NVIDIA NVLINK High-Speed Interconnect", Retrieved from: http://web.archive.org/web/20171113030643/http://www.nvidia.com/object/nvlink.html, Nov. 13, 2017, 2 Pages.
"NVIDIA NVSWITCH", Retrieved from: http://images.nvidia.com/content/pdf/nvswitch-technical-overview.pdf, Retrieved Date: Jan. 21, 2020, 8 Pages.
"PCI Express—An Overview of the PCI Express Standard", Retrieved from: http:/web.archive.org/web/20141216104723/http://www.ni.com/white-paper/3767/en/, Nov. 5, 2014, 6 Pages.
"Verizon Marks Milestone with Successful 400g Technology Trial", Retrieved from: https://www.globenewswire.com/news-release/2018/01/25/1305114/0/en/Verizon-marks-milestone-with-successful-400G-technology-trial.html, Jan. 25, 2018, 2 Pages.
Abadi, et al., "TensorFlow: A System for Large-scale Machine Learning", In Proceedings of the 12th USENIX Symposium on Operating Systems Design and Implementation, Nov. 2, 2016, pp. 265-283.
Barnett, et al., "Global Combine on Mesh Architectures with Wormhole Routing", In Proceedings Seventh International Parallel Processing Symposium, Apr. 13, 1993, pp. 156-162.
Barney, et al., "Message Passing Interface", Retrieved from: http://web.archive.org/web/20181127121654/https://computing.llnl.gov/tutorials/mpi/, Nov. 27, 2018, 43 Pages.
Bhuyan, et al., "Generalized Hypercube and Hyperbus Structures for a Computer Network", In Journal of IEEE Transactions on Computers, vol. C-33, Issue 4, Apr. 1984, pp. 323-333.
Bokhari, et al., "Complete Exchange on a Circuit Switched Mesh", In Proceedings of the Scalable High Performance Computing Conference, Apr. 26, 1992, pp. 300-306.
Chekuri, et al., "Near-Linear Time Approximation Schemes for some Implicit Fractional Packing Problems", In Proceedings of the Twenty-Eighth Annual ACM-SIAM Symposium on Discrete Algorithms, Jan. 2017, pp. 801-820.

Chen, et al., "MXNet: A Flexible and Efficient Machine Learning Library for Heterogeneous Distributed Systems", In Journal of the Computing Research Repository, Dec. 3, 2015, 6 Pages.
Cho, et al., "Blueconnect: Decomposing all-Reduce for Deep Learning on Heterogeneous Network Hierarchy", In Proceedings of the 2nd SysML Conference, Mar. 31, 2019, 11 Pages.
Cho, et al., "PowerAI DDL", In Repository of arXiv:1708.02188, Aug. 8, 2017, 10 Pages.
Dean, et al., "Large Scale Distributed Deep Networks", In Proceedings of the 25th International Conference on Neural Information Processing Systems, Dec. 3, 2012, 9 Pages.
Lecun, Y., "Training with Large Minibatches is Bad for your Health", Retrieved from: https://twitter.com/ylecun/status/989610208497360896?lang=en, Apr. 26, 2018, 2 Pages.
Faraj, et al., "Bandwidth Efficient All-to-All Broadcast on Switched Clusters", In International Journal of Parallel Programming vol. 36, Issue 4, Aug. 2008, 34 Pages.
Zhang, et al., "Poseidon: An Efficient Communication Architecture for Distributed Deep Learning on GPU Clusters", In Proceedings of the 2017 USENIX Annual Technical Conference, Jul. 12, 2017, pp. 181-193.
Gibiansky, Andrew, "Bringing HPC Techniques to Deep Learning", Retrieved from: http://web.archive.org/web/20171120072153/http://research.baidu.com/bringing-hpc-techniques-deep-learning/, Feb. 21, 2017, 15 Pages.
Gong, et al., "Network Performance Aware MPI Collective Communication Operations in the Cloud", In Proceedings of the IEEE Transactions on Parallel and Distributed Systems, Nov. 2015, pp. 3079-3089.
Goyal, et al., "Accurate, Large Minibatch SGD: Training ImageNet in 1 Hour", In Repository of arXiv:1706.02677, Jun. 8, 2017, 12 Pages.
Hunter, Hillery, "IBM Research Achieves Record Deep Learning Performance with New Software Technology", Retrieved from: https://www.ibm.com/blogs/research/2017/08/distributed-deep-learning/, Aug. 8, 2017, 7 Pages.
Jeaugey, Sylvain, "Massively Scale Your Deep Learning Training with NCCL 2.4", Retrieved from: https://devblogs.nvidia.com/massively-scale-deep-learning-training-nccl-2-4/, Feb. 4, 2019, 8 Pages.
Jeaugey, Sylvain, "Optimized Inter-GPU Collective Operations with NCCL 2", Retrieved from: http://on-demand.gputechconf.com/gtc/2017/presentation/s7155-jeaugey-nccl.pdf, 2017, 28 Pages.
Jeon, et al., "Multi-tenant GPU Clusters for Deep Learning Workloads: Analysis and Implications", In Microsoft Research Technical Report, May 2018, 14 Pages.
Johnsson, et al., "Optimum Broadcasting and Personalized Communication in Hypercubes", In Journal of IEEE Transactions on Computers, vol. 38, Issue 9, Sep. 1989, pp. 1249-1268.
Kaestle, et al., "Machine-aware Atomic Broadcast Trees for Multicores", In Proceedings of the 12th Symposium on Operating Systems Design and Implementation, Nov. 2, 2016, pp. 33-48.
Karonis, et al., "Exploiting Hierarchy in Parallel Computer Networks to Optimize Collective Operation Performance", In Proceedings of the Fourteenth International Parallel and Distributed Processing Symposium, May 1, 2000, 8 Pages.
Kielmann, et al., "MAGPIE: MPI's Collective Communication Operations for Clustered Wide Area Systems", In Proceedings of the Seventh ACM SIGPLAN Symposium on Principles and Practice of Parallel Programming, May 1999, pp. 133-140.
Krizhevsky, Alex, "Learning Multiple Layers of Features from Tiny Images", In Technical report, University of Toronto, Apr. 8, 2009, 60 Pages.
Xiao, et al., "Gandiva: Introspective Cluster Scheduling for Deep Learning", In Proceedings of the 13th USENIX Symposium on Operating Systems Design and Implementation, Oct. 8, 2018, pp. 595-610.
Lovasz, Laszlo, "On Two Minimax Theorems in Graph", In Journal of Combinatorial Theory, Series B, vol. 21, Issue 2, Oct. 1976, pp. 96-103.
Masters, et al., "Revisiting Small Batch Training for Deep Neural Networks", In Repository of arXiv: 1804.07612, Apr. 20, 2018, 18 Pages.

(56) References Cited

OTHER PUBLICATIONS

Narayanan, et al., "PipeDream: Generalized Pip eline Parallelism for DNN Training", In Proceedings of the 27th ACM Symposium on Operating Systems Principles, Oct. 27, 2019, 15 Pages.

Noordhui, Pieter, "Accelerating Machine Learning for Computer Vision", Retrieved from: http:/web.archive.org/web/20180504002834/https://github.com/facebookincubator/gloo, May 4, 2018, 3 Pages.

Paszke, et al., "Automatic Differentiation in PyTorch", In Proceedings of the 31st Conference on Neural Information Processing Systems, 2017, 4 Pages.

Patarasuk, et al., "Bandwidth Optimal All-reduce Algorithms for Clusters of Workstations", In Journal of Parallel and Distributed Computing, vol. 69, Issue 2, Feb. 2009, 24 Pages.

Rabenseifner, Rolf, "Optimization of Collective Reduction Operations", In Proceedings of the International Conference on Computational Science, Jun. 6, 2004, 9 Pages.

Russakovsky, et al., "ImageNet Large Scale Visual Recognition Challenge", In International Journal of Computer Vision, vol. 115, Issue 3, Apr. 11, 2015, pp. 211-252.

Scott, David S., "Efficient All-to-All Communication Patterns in Hypercube and Mesh Topologies", In Proceedings of the 6th Distributed Memory Computing Conference, Apr. 28, 1991, pp. 398-403.

Seide, et al., "CNTK: Microsoft's Open-Source Deep-Learning Toolkit", In Proceedings of the 22Nd ACM SIGKDD International Conference on Knowledge Discovery and Data Mining, Aug. 13, 2016, p. 2135.

Sergeev, et al., "Horovod: Fast and Easy Distributed Deep Learning in TensorFlow", In Repository of arXiv: 1802.05799, Feb. 21, 2018, 10 Pages.

Smith, et al., "Don't Decay the Learning Rate, Increase the Batch Size", In Repository of arXiv:1711.00489v1, Nov. 2017, 11 Pages.

Thakur, et al., "Optimization of Collective Communication Operations in MPICH", In International Journal of High Performance Computing Applications, vol. 19, Issue 1, Feb. 2005, pp. 49-66.

Thomas, et al., "CacheCloud: Towards Speed-of-light Datacenter Communication", In Proceedings of the 10th USENIX Conference on Hot Topics in Cloud Computing, Jul. 2018, 7 Pages.

Vadhiyar, "Automatically Tuned Collective Communications", In Proceedings of the 2000 ACM/IEEE Conference on Supercomputing, Nov. 4, 2000, 11 Pages.

Wu, Paul, "Removing Roadblocks on the Path to 400g and Beyond", Retrieved from: https://www.ofcconference.org/en-US/home/about/ofc-blog/2018/march-2018/removing-roadblocks-on-the-path-to-400g-and-beyond/, Mar. 12, 2018, 4 Pages.

Zhao, et al., "Butterfly Mixing: Accelerating Incremental-Update Algorithms on Clusters", In Proceedings of the 2013 SIAM International Conference on Data Mining, May 2, 2013, pp. 785-793.

Wang, et al., "Blink: Fast and Generic Collectives for Distributed ML", In Repository of arXiv: 1910.04940, Oct. 11, 2019, 17 Pages.

"Office Action Issued in European Patent Application No. 19817018. 5", dated Mar. 14, 2023, 12 Pages.

\* cited by examiner

MITIGATING COMMUNICATION BOTTLENECKS DURING PARAMETER EXCHANGE IN DATA-PARALLEL DNN TRAINING

CROSS-REFERENCE TO RELATED APPLICATIONS

This application claims the benefit of U.S. Provisional Patent Application No. 62/770,053, entitled "Mitigating Communication Bottlenecks During Parameter Exchange in Data-Parallel DNN Training," which was filed on Nov. 20, 2018, and which is expressly incorporated herein by reference in its entirety.

BACKGROUND

Deep neural networks ("DNNs") are loosely modeled after information processing and communication patterns in biological nervous systems, such as the human brain. DNNs can be utilized to solve complex classification problems such as, but not limited to, object detection, semantic labeling, and feature extraction. As a result, DNNs form the foundation for many artificial intelligence ("AI") applications, such as computer vision, speech recognition, and machine translation. DNNs can match or exceed human accuracy in many of these domains.

The high-level of performance of DNNs stems in part from their ability to extract high-level features from input data after using statistical learning over a large data set to obtain an effective representation of an input space. However, the superior performance of DNNs comes at the cost of high computational complexity. High performance specific-purpose processors, such as graphics processing units ("GPUs"), are commonly utilized to provide the high level of computational performance required by many DNN applications.

As DNNs have become more widely developed and used, however, model sizes have grown to increase effectiveness. Models today have tens to hundreds of layers, commonly totaling 10-20 million parameters. Models developed for such tasks can take a long time to train; for example, models for image classification tasks can often take days or even weeks to train on a single GPU. Thus, fast training of large deep learning models requires distributed training on many GPUs.

The most widely used method for distributed DNN training is data-parallel training. In data-parallel training, each GPU has a full copy of the model parameters and trains independently on a subset of the input data. During training, GPUs frequently synchronize model parameters with the other GPUs involved in training. Model parameter synchronization across GPUs, however, introduces significant overhead when training at scale—a problem accentuated by the fact that GPU computation is getting faster and model sizes are growing larger, thus making communication overheads even greater.

It is with respect to these and other technical challenges that the disclosure made herein is presented.

SUMMARY

Technologies are disclosed for mitigating communication bottlenecks during model parameter exchange while performing data-parallel DNN training. Through implementations of the disclosed technologies, model parameter synchronization during data-parallel DNN training can be performed faster than possible using previous solutions. As a result, DNN training time can be reduced, thereby conserving computing and energy resources. Other technical benefits not specifically mentioned herein can also be realized through implementations of the disclosed subject matter.

In order to realize the technical benefits mentioned briefly above, and potentially others, technologies are disclosed herein for dynamically generating communication primitives for use in parameter synchronization during data-parallel DNN training by packing directed spanning trees. The disclosed technologies can minimize the number of trees generated and can be expanded to leverage heterogeneous inter-GPU communication channels for hybrid, and faster, data transfers.

In one configuration, an interconnect topology for communication between GPUs in a computing system can be determined. The interconnect topology can be heterogeneous and can include inter-GPU point-to-point connections (e.g. an NVIDIA NVLINK topology) and shared interconnects (e.g. a Peripheral Component Interconnect Express ("PCIe") topology).

A quantity of directed spanning trees can then be generated for the interconnect topology and packed. The directed spanning trees include data that defines the connections to be utilized between the GPUs and the amount of data to be transmitted on each connection. The number of directed spanning trees to be packed can be selected in order to minimize the number of directed spanning trees, while maximizing the number of communication links between the GPUs that are utilized. The number of directed spanning trees can also be selected to maximize the utilization of bandwidth available on the communication links.

Program code can be generated for implementing the data transfer defined by the directed spanning trees. When the program code is executed, the directed spanning trees are used to pipeline the transmission of chunks of data, such as model parameters used during data-parallel DNN training, between the GPUs. The program code can also determine an optimal chunk size for transferring data between the GPUs.

It is to be appreciated that while the configurations disclosed herein are primarily described in the context of the transmission of DNN model parameters between GPUs, the disclosed technologies can be used to transmit other types of data between other types of compute nodes (e.g. central processing units ("CPUs"), networked computing devices, etc.). It is to be further appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
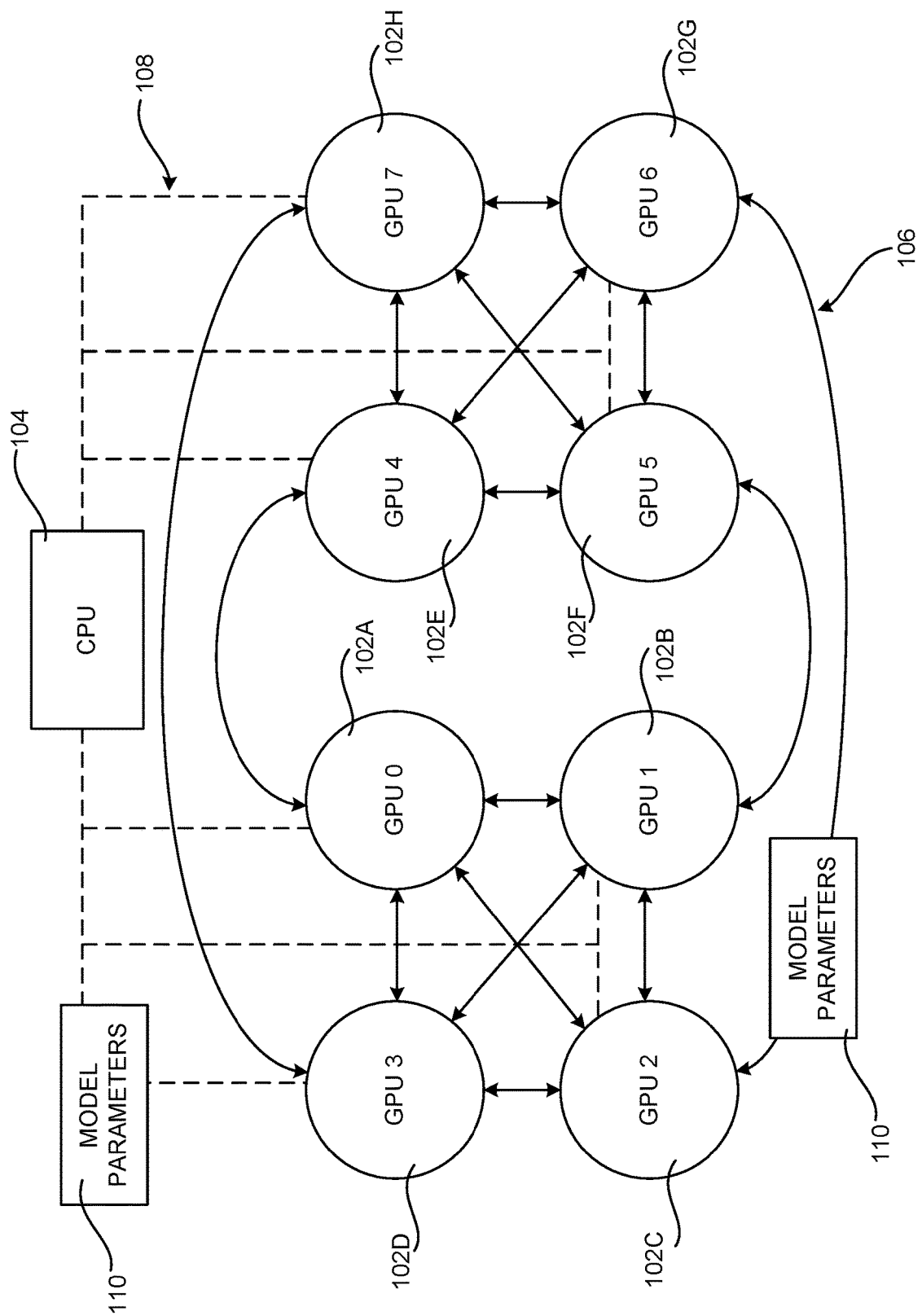
FIGS. 1A and 1B illustrate several examples of a hybrid mesh-cube interconnect topology for inter-GPU communications in several illustrative server computers.

The following detailed description is directed to technologies for mitigating communication bottlenecks during model parameter synchronization while performing data-parallel DNN training. As discussed briefly above, implementations of the disclosed technologies can perform model synchronization during data-parallel DNN training more efficiently than previous solutions. As a result, DNN training time can be reduced, thereby conserving computing resources. Other technical benefits not specifically mentioned herein can also be realized through implementations of the disclosed subject matter.

While the subject matter described herein is presented in the general context of a communications library for optimizing communication during data-parallel DNN training, those skilled in the art will recognize that other implementations can be performed in combination with other types of computing systems and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., technologies for mitigating communication bottlenecks during parameter exchange in data-parallel DNN training will be described.

Prior to describing the disclosed technologies for mitigating communication bottlenecks during parameter exchange while performing data-parallel DNN training in detail, a brief overview of DNN models, DNN model training, and data-parallel DNN training will be provided. A DNN model generally consists of data defining a sequence of layers of different types (e.g. convolutional, fully connected, and pooling layers). DNN models are typically trained using a labeled dataset (e.g. a set of images that have been labeled with data describing the content in the images).

A DNN model is trained across multiple epochs. In each epoch, the DNN model trains over all of the training data in the dataset in multiple steps. In each step, the current model first makes a prediction for a subset of the training data, which might be referred to herein as a "minibatch" or a "batch." This step is commonly referred to as a "forward pass."

To make a prediction, input data from a minibatch is fed to the first layer of the DNN model, which is commonly referred to as an "input layer." Each layer of the DNN model then computes a function over its inputs, often using learned parameters, or weights, to produce an input for the next layer. The output of the last layer, commonly referred to as the "output layer," is a class prediction. Based on the label predicted by the DNN model and the actual label of each instance of training data, the output layer computes a loss, or error function. In a "backward pass" of the DNN model, each layer of the DNN model computes the error for the previous layer and the gradients, or updates, to the weights of the layer that move the DNN model's prediction toward the desired output.

One goal of DNN training is to obtain a DNN model having a desired level of accuracy in as little time as possible. This goal can be quantified with two metrics: statistical efficiency (i.e. the number of epochs required to reach a desired level of accuracy) and hardware efficiency (i.e. the time required to complete a single epoch). The total training time to reach a desired accuracy level is the product of these two metrics. The result of training a DNN model is a set of model parameters, also called "weights" or "kernels." These parameters represent a transform function that can be applied to an input with the result being a classification, or semantically labeled output.

To train large models in a reasonable amount of time, training can be performed in parallel across multiple GPUs using various mechanisms, including data-parallelism. In data-parallelism, or data-parallel processing, the training data set is partitioned across multiple GPUs. Each GPU maintains a full copy of the DNN model and trains on its own partition of training data, while periodically synchronizing model parameters with other GPUs.

During data-parallel DNN training, GPUs frequently exchange model parameters with the other GPUs involved in training. Parameter synchronization across GPUs, however, introduces significant overheads when training at scale—a problem accentuated by the fact that GPU computation is getting faster and model sizes are growing larger, thus making communication overheads even greater. The technologies disclosed herein address these and potentially other technical considerations.

Referring now to the drawings, in which like numerals represent like elements throughout the several FIGS., aspects of various technologies for mitigating communication bottlenecks during parameter exchange while performing data-parallel DNN training will be described. In the following detailed description, references are made to the accompanying drawings that form a part hereof, and which are shown by way of illustration specific configurations or examples.

FIG. 1A shows an example hybrid mesh-cube interconnect topology for inter-GPU communications in an illustrative server computer that includes eight GPUs 102A-102G (which might be referred to collectively as the "GPUs 102").

In the example configuration shown in FIG. 1A, the interconnect topology utilized to connect the GPUs 102 includes an inter-GPU point-to-point topology 106 and a shared interconnect topology 108. The inter-GPU point-to-point topology 106 is illustrated in FIG. 1A as solid lines between the GPUs 102 and the shared interconnect topology 108 is illustrated as dashed lines between the GPUs 102. The inter-GPU point-to-point topology 106 and the shared interconnect topology 108 can be utilized to synchronize model parameters 110 between the GPUs 102.

The inter-GPU point-to-point topology 106 provides direct connections between the GPUs 102. In some configurations, the inter-GPU point-to-point topology 106 is an NVIDIA NVLINK interconnect from NVIDIA CORP. The inter-GPU point-to-point topology 106 can utilize other technologies in other configurations.

The shared interconnect topology 108 connects the GPUs 102 to a bus 108, which is also connected to a CPU 104. The shared interconnect topology 108 is a PCIe interconnect in some configurations. A PCIe interconnect can be used to connect multiple GPUs 102 to each other, and to a CPU 104 and I/O devices, through switches typically configured in a tree hierarchy. Other types of shared interconnect topologies can be utilized in other configurations.

Figure 1B:
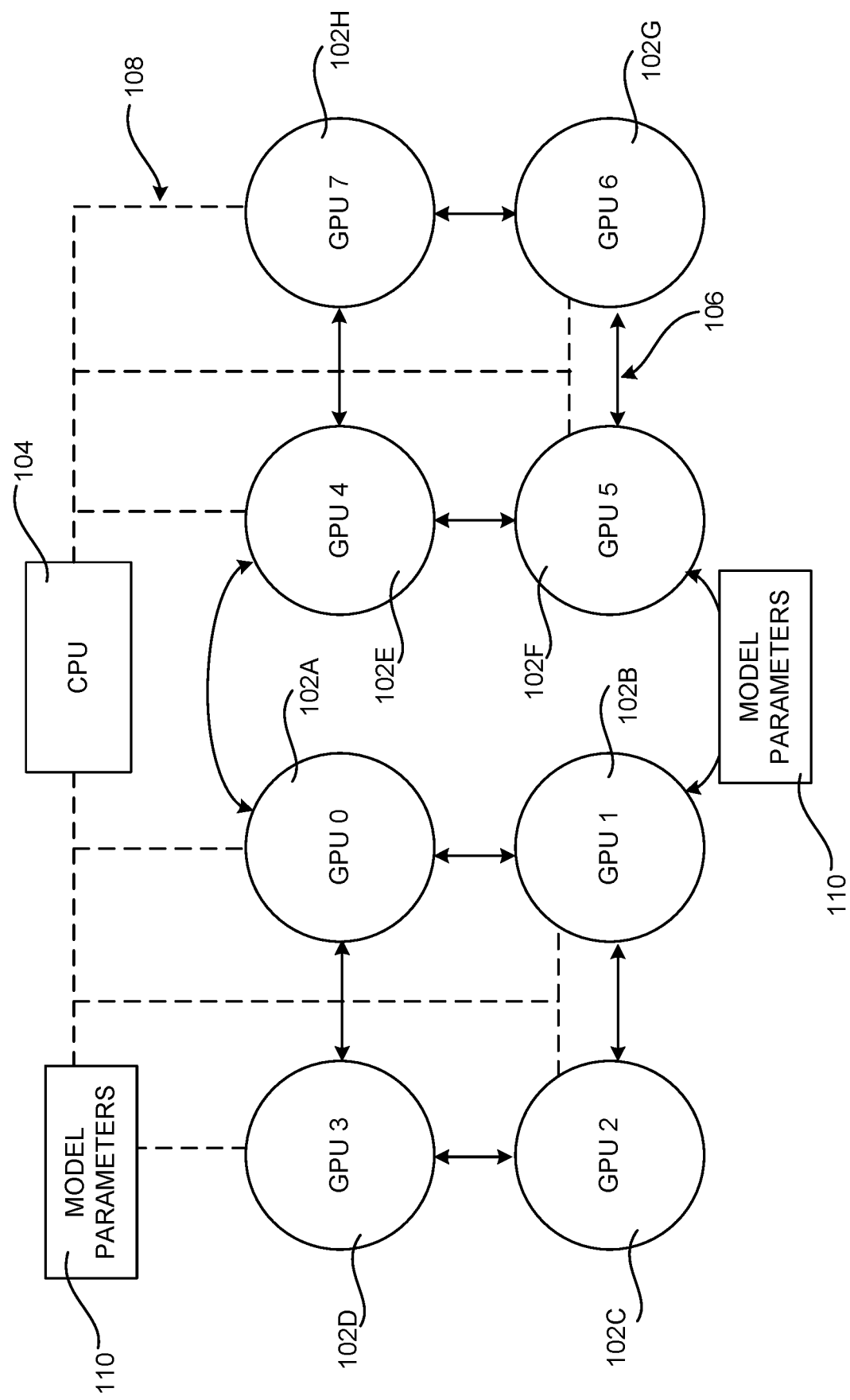

FIG. 1B shows an example hybrid mesh-cube interconnect topology for inter-GPU communications in another illustrative server computer that includes eight GPUs 102. The example interconnect topology shown in FIG. 1B also includes an inter-GPU point-to-point topology 106 and a shared interconnect topology 108. In this example, however, the inter-GPU connections are different than the inter-GPU point-to-point topology 106 shown in FIG. 1A. Other server computers can include other interconnect topologies, thereby causing interconnect topology heterogeneity across different server computers. This type of topology heterogeneity can be caused by different versions of the same inter-GPU point-point connection standards or other reasons.

Existing mechanisms for synchronizing DNN model parameters 110 typically use ring-based protocols, which fail to leverage link heterogeneity such as that illustrated in FIGS. 1A and 1B. In particular, the throughput of a ring is typically limited by the link having the lowest bandwidth, and hence these protocols restrict themselves to homogeneous links. For example, for multi-GPU communication within a particular machine configuration, existing solutions might prioritize using only connections on an inter-GPU point-to-point topology 106 (e.g. NVLINK) over connections on a shared interconnect topology 108 (e.g. PCIe) since the shared interconnect topology 108 will be the performance bottleneck if included in a ring. This is illustrated in FIG. 3A, where an example three GPU configuration has been constructed for a broadcast from GPU 102A.

Figure 3B:
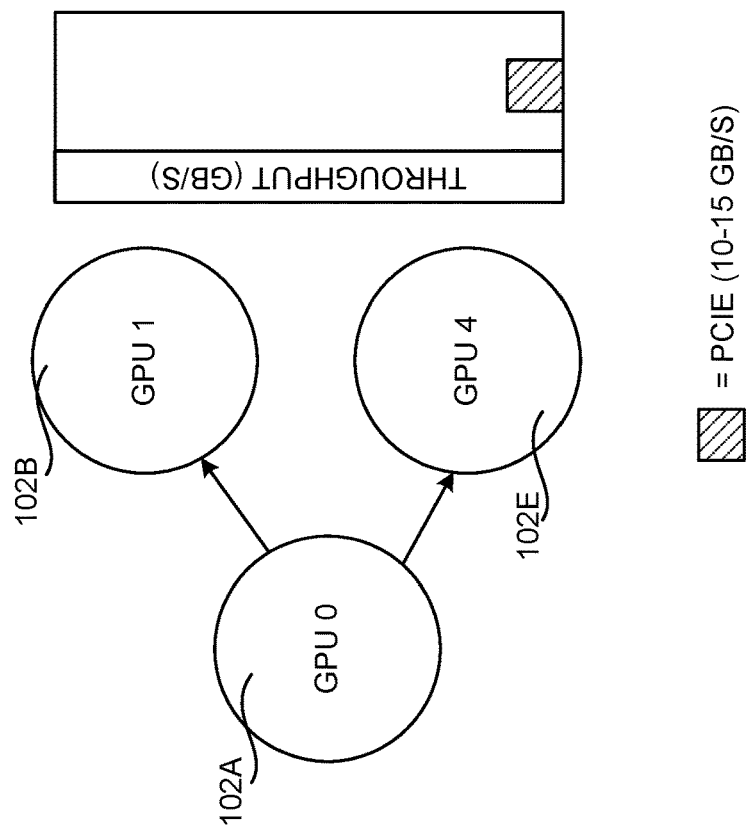
FIGS. 3A and 3B illustrate the broadcast throughput for two example GPU allocations.
Figure 3A:
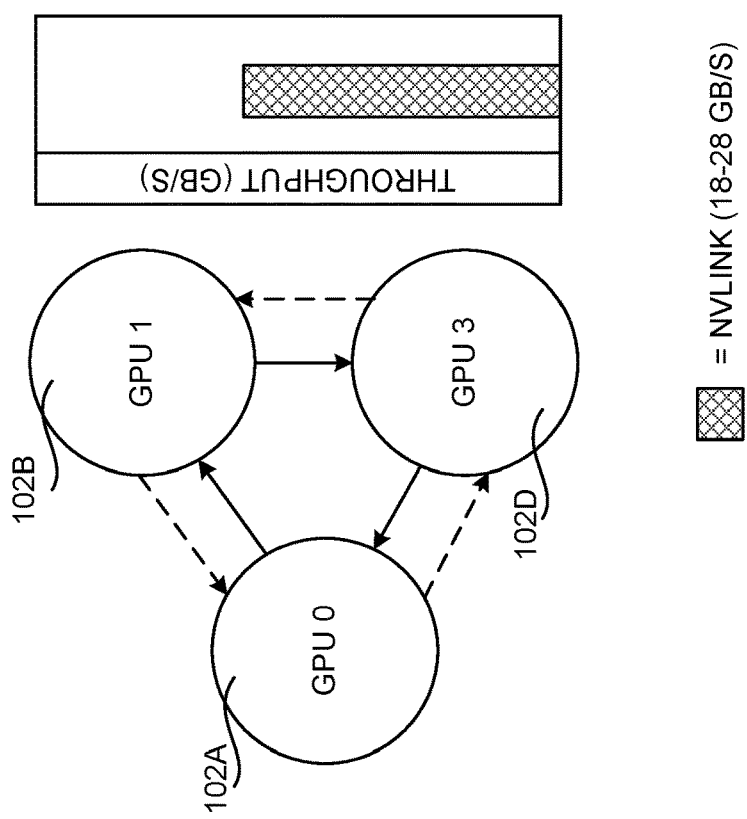

In the example shown in FIG. 3A, a previous solution builds two rings using bi-directional inter-GPU point-to-point connections and ignores the shared connections. In particular, one ring (shown in solid lines in FIG. 3A) is constructed from GPU 102A to GPU 102B to GPU 102D and back to GPU 102A. Another ring (shown in dashed lines in FIG. 3A) is constructed from GPU 102A to GPU 102D to GPU 102B and back to GPU 102A. The shared interconnect topology 108 is not utilized in this configuration.

Previous schedulers that allocate GPUs 102 to DNN training jobs, particularly in multi-tenant server clusters, are oblivious to interconnect topologies between GPUs. Many training jobs can potentially be co-located on the same machine. The resulting interconnect topology heterogeneity caused by scheduler allocation can result in link underutilization in current ring-based protocols for parameter exchange.

In the example shown in FIG. 3B, for instance, if the GPU 102D were replaced with the GPU 102E, the illustrated configuration generated by a previous solution is unable to utilize the bi-directional inter-GPU point-to-point topology 106 (e.g. NVLINK) between the three GPUs 102A, 102B, and 102D. In particular, the lack of inter-GPU point-to-point connections between GPUs 102B and 102D prevents this solution from constructing inter-GPU point-to-point connection-only rings and, as a result, only shared interconnect topology 108 connections would be utilized. Link underutilization can also occur even when rings can be constructed using inter-GPU point-to-point connections.

In order to address the technical problems described above, and potentially others, a communication library for inter-GPU model parameter exchange is disclosed herein that can achieve near-optimal link utilization in some configurations. In particular, to handle interconnect topology heterogeneity from hardware generations or partial allocations from cluster schedulers, the disclosed technologies dynamically generate optimal communication primitives for a given interconnect topology, or topologies. The communication primitives can be utilized to synchronize model parameters between GPUs 102 simultaneously using both an inter-GPU point-to-point topology 106 and a shared interconnect topology 108.

As will be described in greater detail below, the disclosed communication library can discover the set of communication links available for a given training job at runtime and select an interconnect topology for scheduling inter-GPU communication with appropriate link capacities. Using the selected interconnect topology, the disclosed technologies can achieve a near optimal communication rate by packing directed spanning trees. FIGS. 2A-2D illustrate aspects of this process.

Figure 2A:
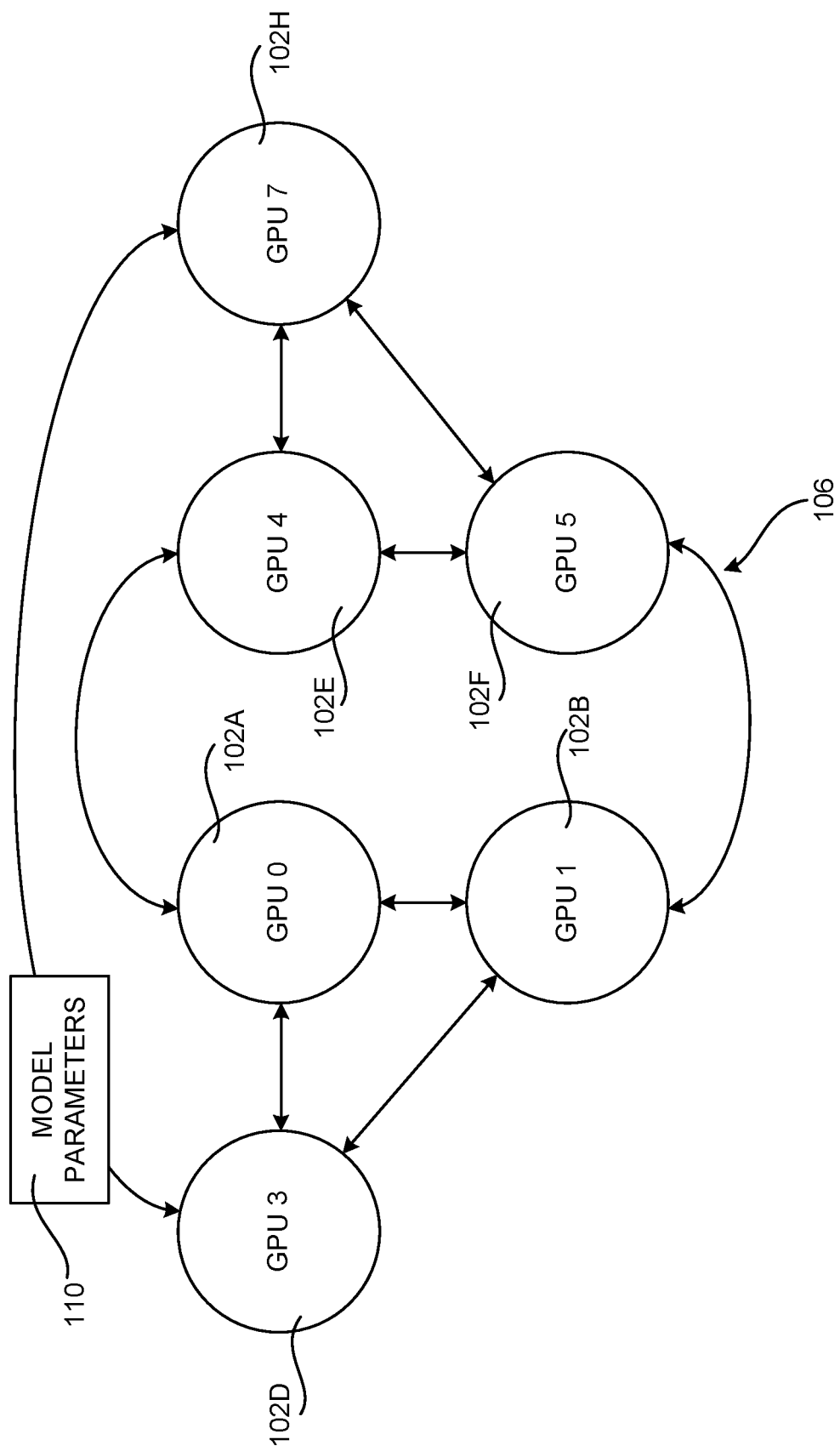
FIG. 2A illustrates the configuration of a sample GPU interconnect topology for a six CPU server computer.
Figure 2B:
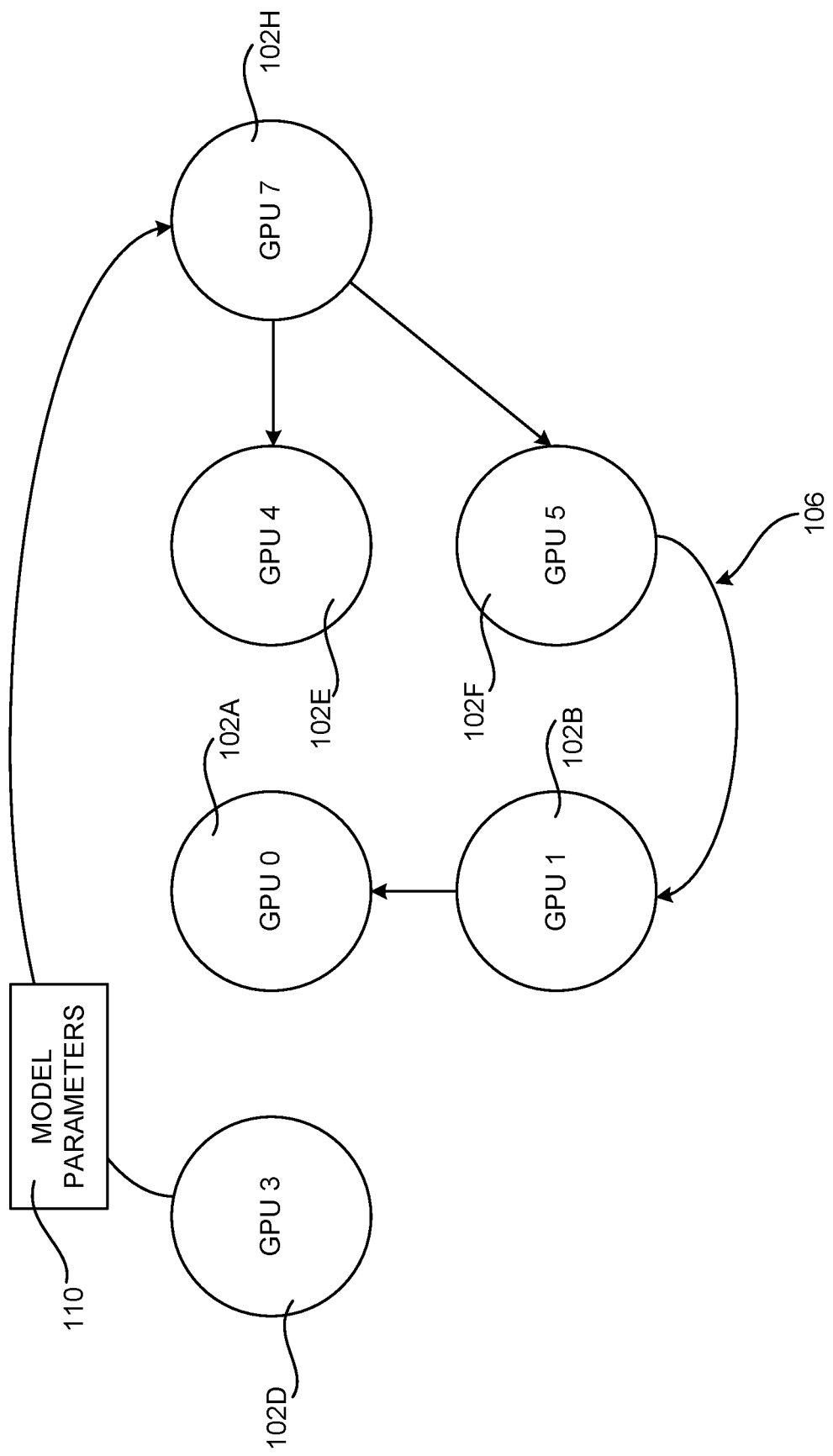
FIGS. 2B-2D illustrate the configuration of several directed spanning trees generated by the disclosed technologies for the sample GPU interconnect topology shown in FIG. 2A.
Figure 2C:
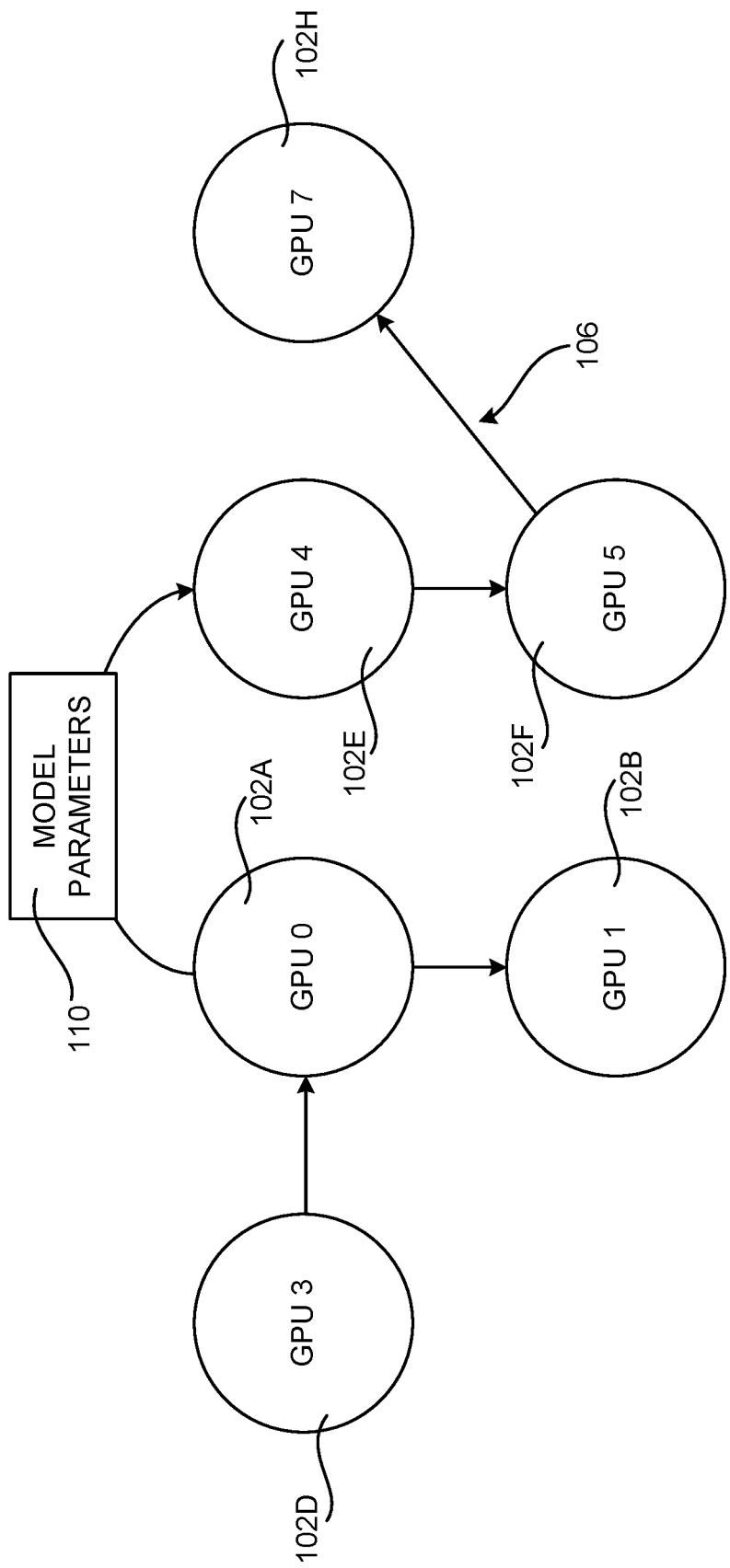
Figure 2D:
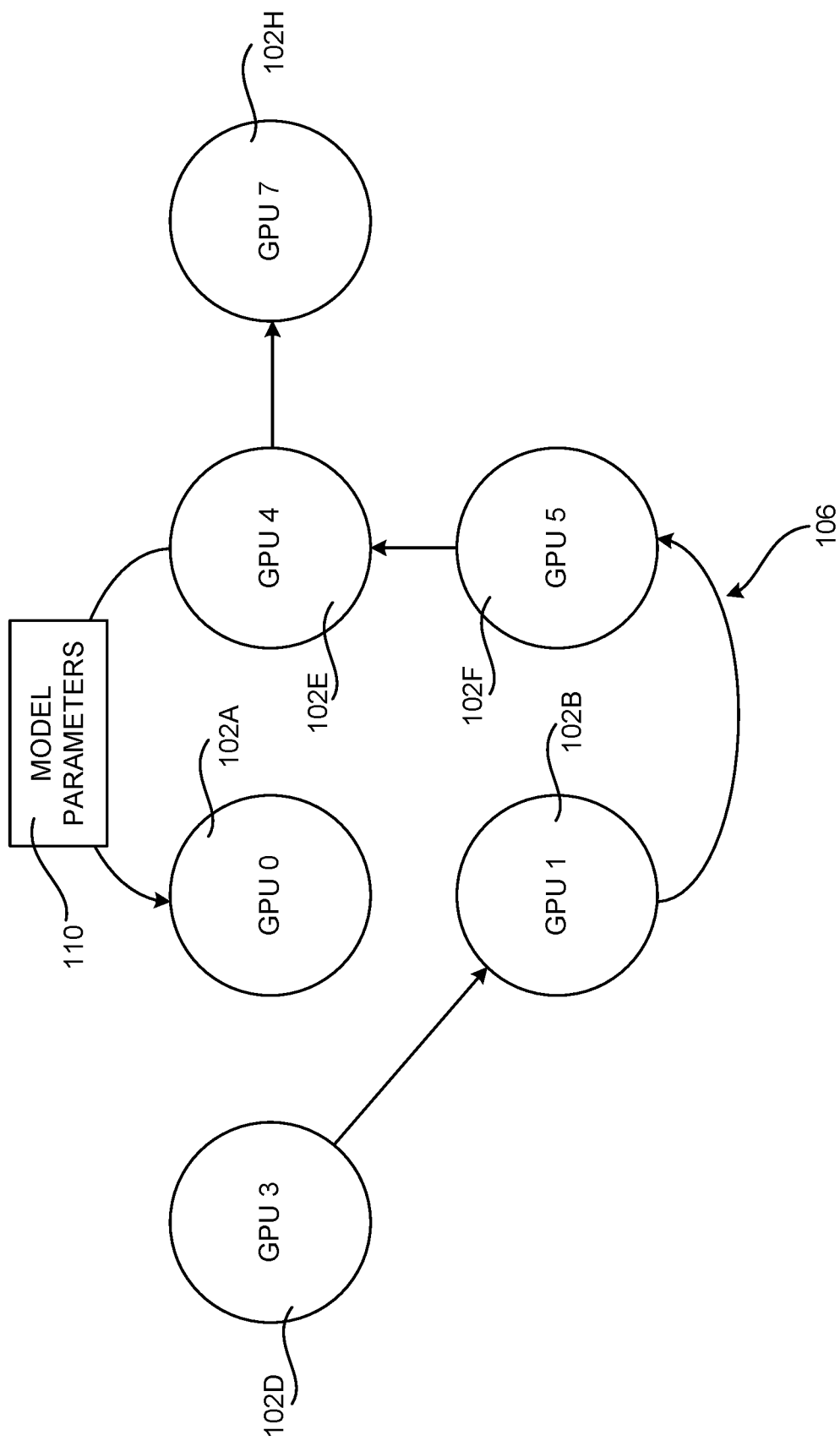

FIG. 2A illustrates the configuration of a sample inter-GPU point-to-point topology 106 for a six GPU 102 server computer. FIGS. 2B-2D illustrate the configuration of several directed spanning trees generated by the disclosed technologies for the example topology shown in FIG. 2A. The directed spanning trees shown in FIGS. 2B-2D can be utilized simultaneously to transmit model parameters 110 between the illustrated GPUs 102.

The disclosed technologies can also simultaneously transfer data, such as the model parameters 110, on both inter-GPU point-to-point connections (e.g. NVLINK) and shared interconnects (e.g. PCIe). The disclosed technologies can additionally balance the amount of data transferred across hybrid links. Additional details regarding these and other aspects will be provided below with regard to FIGS. 4-8.

Figure 4:
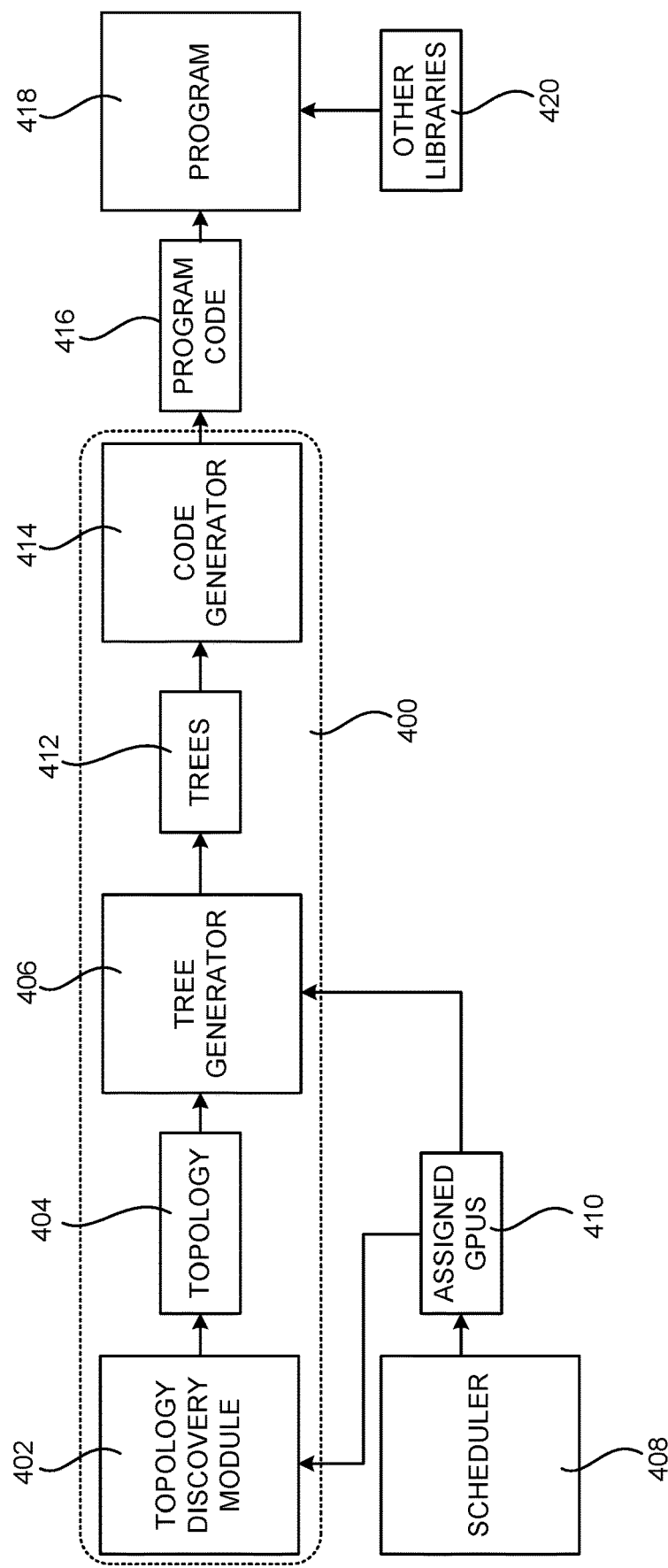
FIG. 4 shows an example toolchain workflow for implementing aspects of the technologies disclosed herein.

FIG. 4 shows an example toolchain workflow for implementing aspects of the technologies disclosed herein. As shown in FIG. 4, a communication library 400 includes a topology discovery module 402, a tree generator 406, and a code generator 414. The topology discovery module 402 can perform interconnect topology discovery at runtime once a scheduler 408 has scheduled a deep learning job and assigned a set of GPUs 102 to the job.

The topology discovery module 402 can utilize profiling tools to determine the GPU interconnect topology of the computing device upon which the job is to be scheduled. As discussed above, the topology can include both inter-GPU point-to-point connections (e.g. NVLINK) and shared interconnects (e.g. PCIe). The topology discovery module 402 (or the tree generator 406 described below) can also filter the identified topology to include only GPUs 102 that have been allocated to the current job. The topology discovery module 402 can provide data 404 describing the discovered topology to the tree generator 406. The scheduler 408 can also provide data 410 identifying the GPUs 102 that have been assigned to the current job.

Once the interconnect topology for the current job has been determined, the tree generator 406 models collective communication operations as flows on a directed graph, where every GPU 102 is represented by a vertex and every link (e.g. an NVLINK link or a PCIe link) is marked as a directed edge. Each directed edge also has an associated capacity that is proportional to the bandwidth on the corresponding link.

The tree generator 406 also determines an optimal set of packed directed spanning trees. This operation outputs data 412 describing a set of directed spanning trees and weights corresponding to how much data should be sent over each of the spanning trees. The tree generator 406 provides the data 412 to the code generator 414, which is described in detail below.

In one configuration, the tree generator 406 utilizes multiplicative weight update ("MWU") to find the optimal set of packed directed spanning trees. During MWU, the tree generator 406 assigns every edge a capacity and a weight that indicates how much of the capacity has been used. An iterative method is then performed where, at each iteration, the minimum weight spanning tree is identified given the current assignment. The weight on the chosen tree is then incremented by a factor and the weights on the graph are updated correspondingly. The algorithm can converge on a set of directed spanning trees and corresponding weights for each of them. The total rate for broadcast will be the sum of weights.

The number of directed spanning trees generated by the tree generator 406 is minimized in some configurations by utilizing an integer linear program ("ILP"). By minimizing the number of directed spanning trees, the amount of data transferred through a single tree can be optimized, which can result in better link utilization.

It is to be appreciated that the above discussion focuses on one-to-many operations like "broadcast" and "gather," where packing directed spanning trees yields the optimal rate. To handle many-to-many operations, an undirected graph can be created to run a many-to-one primitive using one direction of links and, correspondingly, run a one-to-many primitive in the other direction. For example, to do an "all-reduce" operation on a directed graph, a reduce operation to a chosen root vertex using the undirected graph is performed and a "broadcast" operation from the root vertex is performed using the same tree, but with links going in the reverse direction. This strategy of using two undirected trees can match the lower bound of the number of messages required for "all-reduce" operations.

In order to construct a unified topology with both sets of links (i.e. inter-GPU point-to-point links and shared links), two separate sets of trees can be constructed, one over inter-GPU point to point links (e.g. NVLink links) and another over shared links (e.g. PCIe links). One of the challenges with this approach is to balance the amount of data that is transferred over each link type. In order to address this challenge, the maximum time taken by each of the transfers is minimized by computing an optimal split of the data to be transmitted among the available communication links.

In one implementation, a code generator 414 parses the data 412 defining the directed spanning trees and generates program code 416 (e.g. Compute Unified Device Architecture ("CUDA") code) for performing the transfer using the directed spanning trees and weights. The program code 416 can be packaged into a compatible shared library. When the training program 418 is invoked, it can load the program code 416 along with other libraries 420.

In some configurations, the program code 416 is implemented as an application programming interface ("API") compatible with pre-existing communication libraries. For example, and without limitation, the resulting program code 416 can be implemented as an NVIDIA Collective Communications Library ("NCCL")-compatible API and can be seamlessly plugged into distributed machine learning ("ML") frameworks such as, but not limited to, TENSORFLOW, PYTORCH, CNTK, and MXNET. Program code 416 compatible with other types of APIs and machine learning frameworks can be generated in other configurations. This ensures that existing programs 418 can execute the program code 416 to utilize the technologies disclosed herein with little or no modification.

In order to illustrate the aspects described above further, the use of the disclosed technologies to perform two types of collective communications will be described: "broadcast" and "all-reduce." Currently, these are the most frequently used primitives by deep learning workloads, and other collective primitives follow similar patterns. For example, "gather" is the inverse of "broadcast," and "all-gather" is "all-reduce" without using a reduction function.

In order to perform a "broadcast" operation, the directed spanning trees generated by the procedure described are parsed, with each spanning tree having a different weight associated with it. Once the input buffer to be broadcast from the root node is received, the buffer is split among all the directed spanning trees based on their weights. The memory offsets at the destination GPUs 102 are then calculated.

To perform data transfer on a link in the tree, a memory copy command (e.g. CUDAMEMCPY) from the source to the destination GPU 102 is issued. To reduce latency, instead of transmitting all the data assigned to the tree at once, the data in each tree is further divided into multiple small "chunks" in the manner described below with regard to FIG. 5.

Once a chunk has been transferred, an event can be issued (e.g. a CUDA event) to notify the destination. Streams (e.g. CUDA streams) can be used to enable parallel transfers across trees. Each stream represents an ordered sequence of command executions. High link utilization can be achieved by using one stream per link.

As discussed briefly above, "all-reduce" operations can utilize the bi-directional nature of the communication links between GPUs 102. In particular, reductions are performed in one direction to a root node. Once the root node computes the final reduce result, it is broadcast in the reverse direction. The reduction functions (e.g. min, max, product, etc.) are implemented as CUDA kernels in one configuration.

Figure 5:
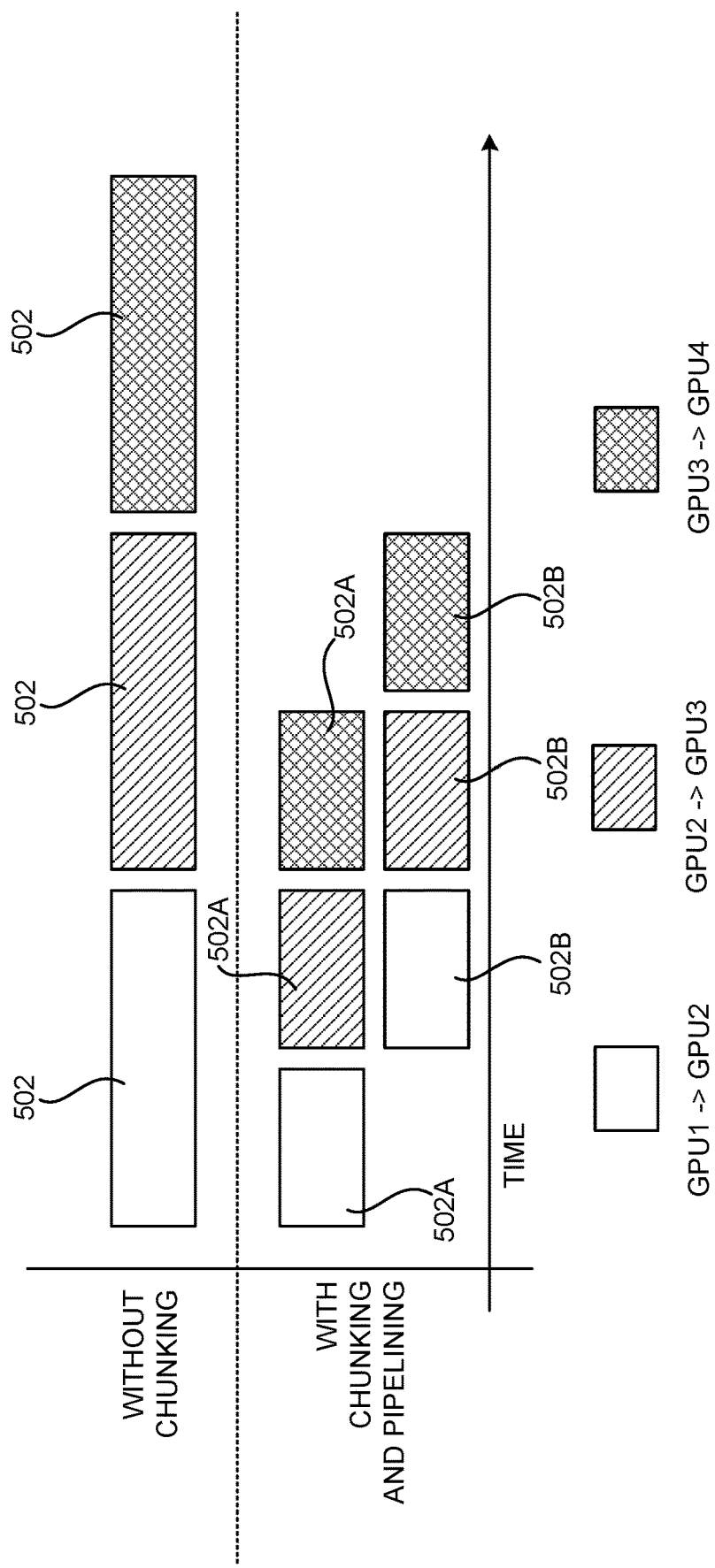
FIG. 5 is a timing diagram illustrating aspects of one mechanism disclosed herein for chunking and pipelining the transmission of chunks of data between GPUs.

FIG. 5 is a timing diagram illustrating aspects of one mechanism disclosed herein for chunking and pipelining the transmission of chunks of data, such as the model parameters 110, between GPUs 102 to reduce multi-hop latency. As discussed briefly above, the data in each directed spanning tree can be divided into "chunks." Within each stream of data, a chunk is the atomic unit for data copy/synchronization between sender and receiver.

The example shown in FIG. 5 is a four GPU 102 chain scenario where a GPU 102 ("GPU1") has to broadcast data through a chain that includes three other GPUs ("GPU2," "GPU3," and "GPU4"). Using traditional mechanisms, data 502 is transmitted from GPU1 to GPU2. The data 502 is then transmitted from GPU2 to GPU3 and, subsequently, from GPU3 to GPU4.

In order to speed up the transmission of the data, the technologies disclosed herein can divide the data 502 into chunks. For instance, in the example shown in FIG. 5, the data 502 has been divided into two chunks: chunk 502A and chunk 502B. In this example, the chunk 502A is transmitted from GPU1 to GPU2, followed by chunk 502B. At the same time that the chunk 502B is being transmitted from GPU1 to GPU2, the chunk 502A is being transmitted from GPU2 to GPU3. Similarly, the chunk 502B is transmitted from GPU2 to GPU3 at the same time that chunk 502A is transmitted from GPU3 to GPU4. Finally, the chunk 502B is transmitted from GPU3 to GPU4. By chunking the data 502 in this manner, transmission of the data can be pipelined.

In order to select an optimal chunk size to minimize scheduling overhead, the correlation between chunk size and throughput is tested in some configurations. In particular, an initial chunk size might be selected (e.g. 50 MB) and data transmission between GPUs 102 begins. Subsequently, the chunk size might be lowered from 50 MB to 5 MB, for instance. If throughput improves, the chunk size might be lowered to 1 MB. If reducing the chunk size to 1 MB reduces throughput, the chunk size will be selected as 5 MB. In this manner, the optimal chunk size can be selected by testing throughput between the GPUs 102 at a range of chunk sizes. A similar process can be performed for other communication patterns and number of GPUs 102.

In some configurations, an adaptive chunk size selection algorithm is utilized that follows a multiplicative increase, additive decrease scheme across iterations. In these configurations, the chunk size initialized as a small value and increased by a multiplicative factor as long as the measured throughput is increasing. If the throughput decreases, the chunk size is additively decreased until a steady state is reached. To avoid hysteresis, the chunk size is marked as stable if the throughput does not change significantly (e.g. 1 GB/s) across iterations.

Another challenge with using multiple directed spanning trees on existing hardware is that current solutions do not provide any direct control on how links are shared. For example, if there are two trees each having an associated weight of 0.5 that are passing through the same link, then a fair sharing scheme would transmit one chunk from the first tree followed by one chunk from second tree. However, current solutions do not always result in fair sharing, which means that chunks from one of the trees could be arbitrarily delayed. This can introduce gaps in the forwarding pipeline and harm the effective throughput, latency achieved.

This problem is addressed in some configurations by reusing streams (e.g. CUDA streams) when the same link is used in multiple trees at roughly the same position. For example, two directed spanning trees can both start from source GPU1, which contain two data pieces (D1 for TREE1, D2 for TREE2). Once streams have been created for the first tree, pairwise link positions between the two trees are compared. Note that link GPU1 <-> GPU2 (first hop from the source node) and GPU2 <-> GPU3 (second hop from the source node) are in the same position on both trees. Thus, when creating streams for TREE2, instead of initializing a new stream, the stream associated with TREE1 is re-used. Having assigned the same stream, transfers can be scheduled in order to ensure fair sharing of the link.

Figure 6:
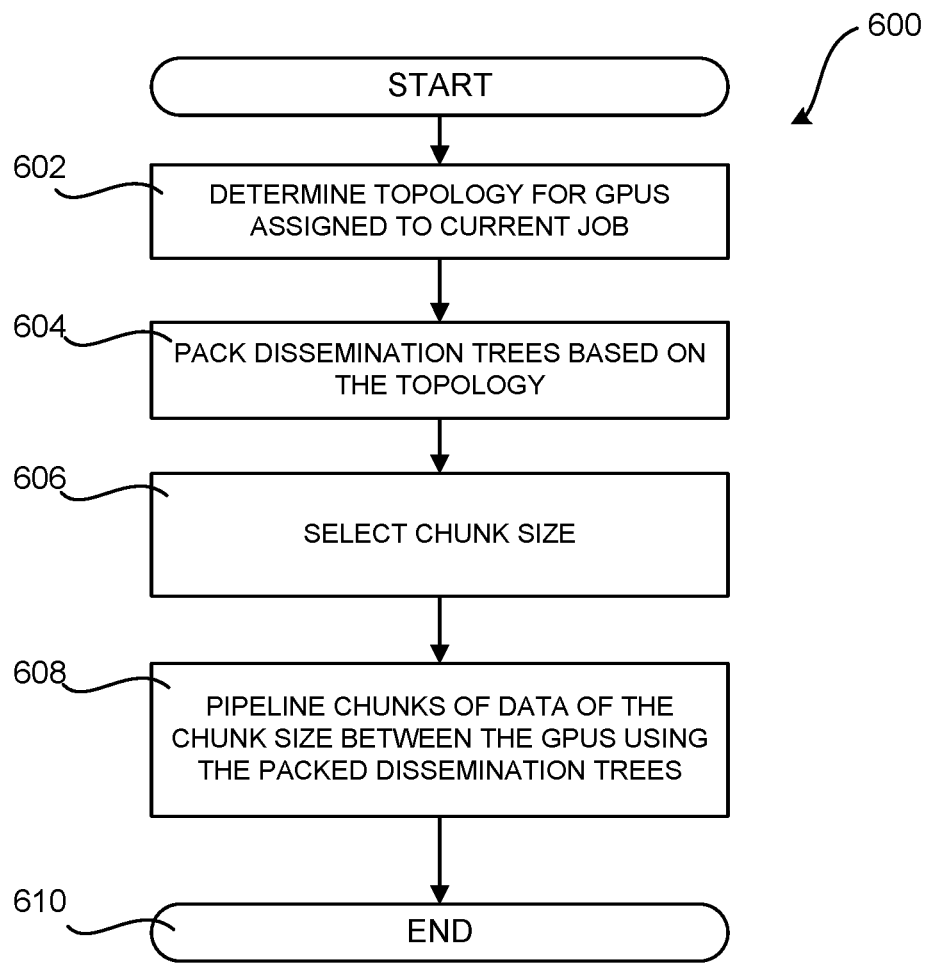
FIG. 6 is a flow diagram showing a routine that illustrates aspects of the operation of the technologies described with reference to FIGS. 1A-5 for mitigating communication bottlenecks during model parameter exchange while performing data-parallel DNN training.

FIG. 6 is a flow diagram showing a routine 600 that illustrates aspects of the operation of the technologies described with reference to FIGS. 1-5 for mitigating communication bottlenecks during parameter exchange while performing data-parallel DNN training, according to one embodiment disclosed herein. It should be appreciated that the logical operations described herein with regard to FIG. 6, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 600 begins at operation 602, where the interconnect topology for the GPUs 102 assigned to a job is determined. As discussed above, the topology discovery module 402 can utilize profiling tools to determine the GPU interconnect topology of the computing device upon which the job is to be scheduled. The topology can include both inter-GPU point-to-point connections (e.g. NVLINK) and shared interconnects (e.g. PCIe). The topology discovery module 402 (or the tree generator 406) can also filter the identified topology to include only GPUs 102 that have been allocated to the current job.

The routine 600 then proceeds from operation 602 to operation 604, where directed spanning trees are packed based upon the topology determined at operation 602. As discussed above, the tree generator 406 can determine an optimal set of packed directed spanning trees. This operation outputs data 412 describing a set of directed spanning trees and weights corresponding to how much data should be sent over each of the spanning trees.

The tree generator 406 provides the data 412 to the code generator 414. The code generator 414, in turn, parses the data 412 defining the directed spanning trees and generates program code 416 (e.g. CUDA code) for performing the transfer using the directed spanning trees and weights.

The routine 600 then proceeds from operation 606, where, at runtime, the program code 416 determines the chunk size for data transmission in the manner described above with regard to FIG. 5. The routine 600 then proceeds to operation 608, where chunks of data having the size determined at operation 606 are pipelined between the GPUs 102 assigned to the current job according to the packed directed spanning trees, also discussed above with regard to FIG. 5. The routine 600 then proceeds from operation 608 to operation 610, where it ends.

Figure 7:
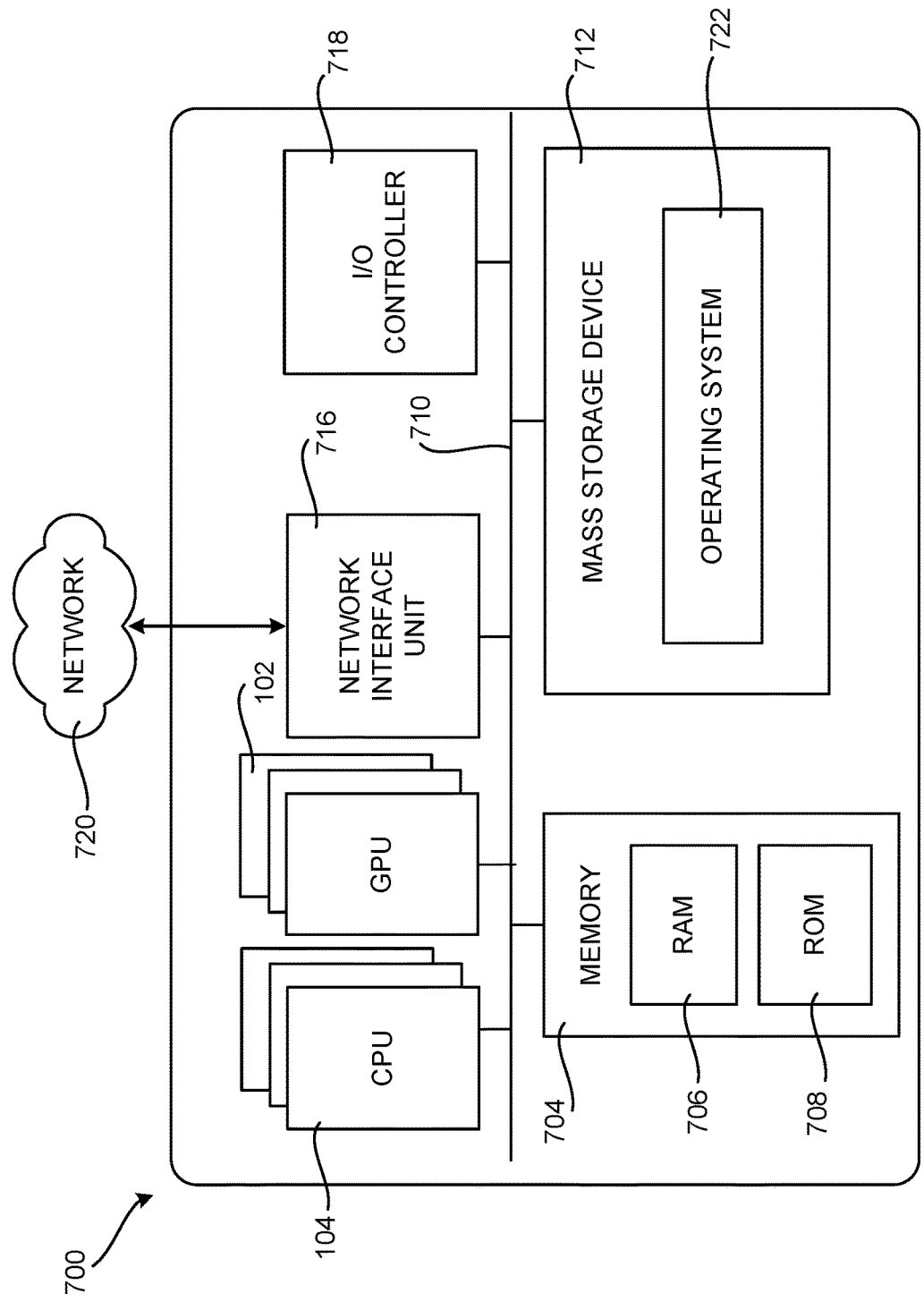
FIG. 7 is a computer architecture diagram showing an illustrative computer hardware and software architecture for a computing device that can implement aspects of the technologies presented herein.

FIG. 7 is a computer architecture diagram showing an illustrative computer hardware and software architecture for a computing device that can implement the various technologies presented herein. In particular, the architecture illustrated in FIG. 7 can be utilized to implement a server computer, mobile phone, an e-reader, a smartphone, a desktop computer, an AR/VR device, a tablet computer, a laptop computer, or another type of computing device.

The computer 700 illustrated in FIG. 7 includes a central processing unit 104 ("CPU"), a system memory 704, including a random-access memory 706 ("RAM") and a read-only memory ("ROM") 708, and a system bus 710 that couples the memory 704 to the CPU 104. The system bus 710 might be a PCIe bus, such as that described above. One or more GPUs 102, such as those described above, can also be connected to the system bus 710. As also discussed above, direct connections can also be made between the GPUs 102, such as through NVLINK connections.

A basic input/output system ("BIOS" or "firmware") containing the basic routines that help to transfer information between elements within the computer 700, such as during startup, can be stored in the ROM 708. The computer 700 further includes a mass storage device 712 for storing an operating system 722, application programs, and other types of programs. The mass storage device 712 can also be configured to store other types of programs and data.

The mass storage device 712 is connected to the CPU 104 through a mass storage controller (not shown) connected to the bus 710. The mass storage device 712 and its associated computer readable media provide non-volatile storage for the computer 700. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 700. For purposes of the claims, the phrase "computer storage medium," and variations thereof, does not include waves or signals per se or communication media.

According to various configurations, the computer 700 can operate in a networked environment using logical connections to remote computers 705 through a network such as the network 720. The computer 700 can connect to the network 720 through a network interface unit 716 connected to the bus 710. It should be appreciated that the network interface unit 716 can also be utilized to connect to other types of networks and remote computer systems. The computer 700 can also include an input/output controller 718 for receiving and processing input from a number of other devices, including a keyboard, mouse, touch input, an electronic stylus (not shown in FIG. 7), or a physical sensor 725 such as a video camera. Similarly, the input/output controller 718 can provide output to a display screen or other type of output device (also not shown in FIG. 7).

It should be appreciated that the software components described herein, when loaded into the CPU 104 and executed, can transform the CPU 104 and the overall computer 700 from a general-purpose computing device into a special-purpose computing device customized to facilitate the functionality presented herein. The CPU 104 can be constructed from any number of transistors or other discrete circuit elements, which can individually or collectively assume any number of states. More specifically, the CPU 104 can operate as a finite-state machine, in response to executable instructions contained within the software modules disclosed herein. These computer-executable instructions can transform the CPU 104 by specifying how the CPU 104 transitions between states, thereby transforming the transistors or other discrete hardware elements constituting the CPU 104.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 700 in order to store and execute the software components presented herein. It also should be appreciated that the architecture shown in FIG. 7 for the computer 700, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 700 might not include all of the components shown in FIG. 7, can include other components that are not explicitly shown in FIG. 7, or can utilize an architecture completely different than that shown in FIG. 7.

Figure 8:
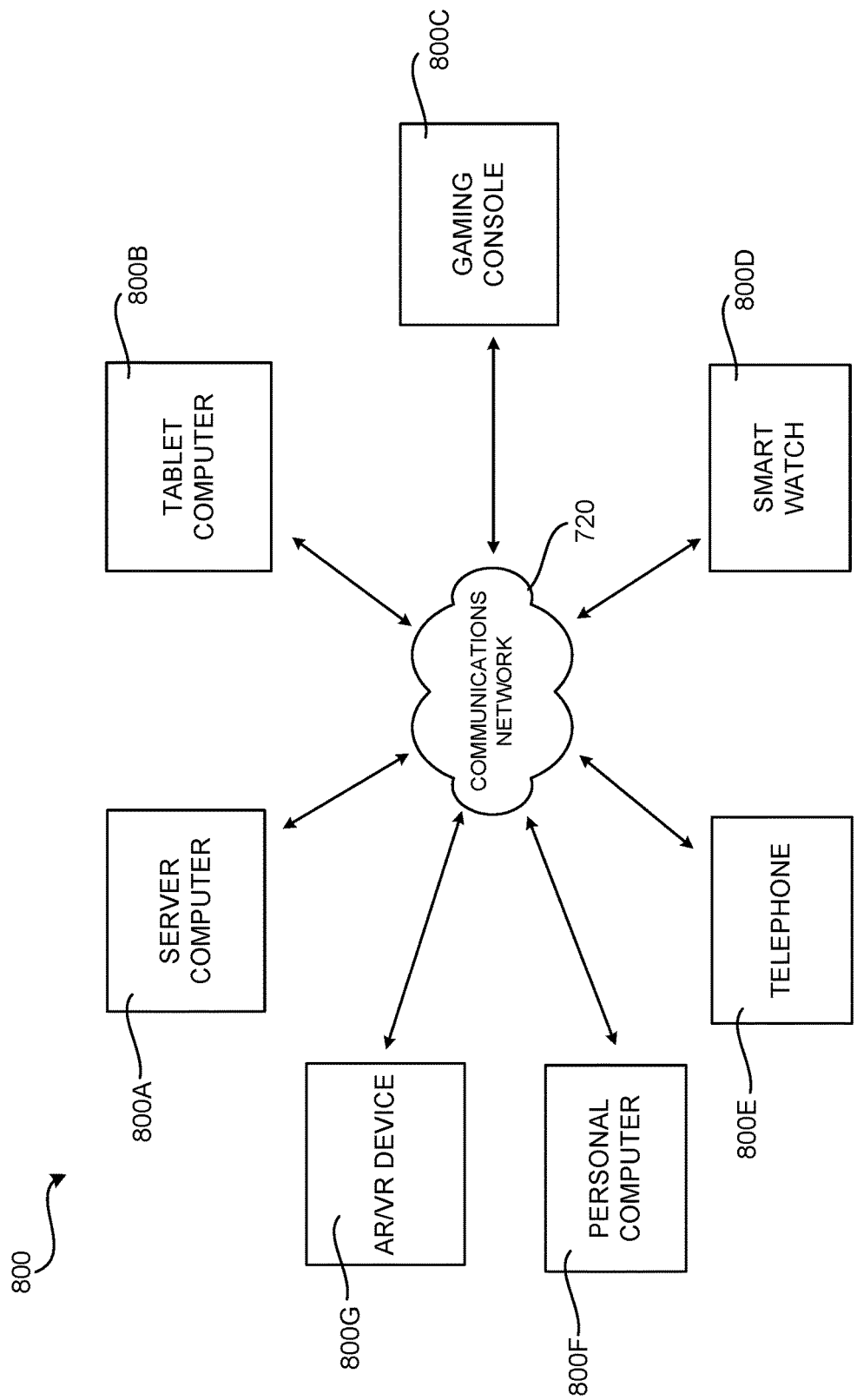
FIG. 8 is a network diagram illustrating a distributed computing environment in which aspects of the disclosed technologies can be implemented.

FIG. 8 is a network diagram illustrating a distributed network computing environment 800 in which aspects of the disclosed technologies can be implemented, according to various embodiments presented herein. As shown in FIG. 8, one or more server computers 800A can be interconnected via a communications network 720 (which may be either of, or a combination of, a fixed-wire or wireless LAN, WAN, intranet, extranet, peer-to-peer network, virtual private network, the Internet, BLUETOOTH® communications network, proprietary low voltage communications network, or other communications network) with a number of client computing devices such as, but not limited to, a tablet computer 800B, a gaming console 800C, a smart watch 800D, a telephone 800E, such as a smartphone, a personal computer 800F, and an AR/VR device 800G.

In a network environment in which the communications network 720 is the Internet, for example, the server computer 800A can be a dedicated server computer operable to process and communicate data to and from the client computing devices 800B-800G via any of a number of known protocols, such as, hypertext transfer protocol ("HTTP"), file transfer protocol ("FTP"), or simple object access protocol ("SOAP"). Additionally, the networked computing environment 800 can utilize various data security protocols such as secured socket layer ("SSL") or pretty good privacy ("PGP"). Each of the client computing devices 800B-800G can be equipped with an operating system operable to support one or more computing applications or terminal sessions such as a web browser (not shown in FIG. 8), or other graphical user interface (not shown in FIG. 8), or a mobile desktop environment (not shown in FIG. 8) to gain access to the server computer 800A.

The server computer 800A can be communicatively coupled to other computing environments (not shown in FIG. 8) and receive data regarding a participating user's interactions/resource network. In an illustrative operation, a user (not shown in FIG. 8) may interact with a computing application running on a client computing device 800B-800G to obtain desired data and/or perform other computing applications.

The data and/or computing applications may be stored on the server 800A, or servers 800A, and communicated to cooperating users through the client computing devices 800B-800G over an exemplary communications network 720. A participating user (not shown in FIG. 8) may request access to specific data and applications housed in whole or in part on the server computer 800A. These data may be communicated between the client computing devices 800B-800G and the server computer 800A for processing and storage.

The server computer 800A can host computing applications, processes and applets for the generation, authentication, encryption, and communication of data and applications, and may cooperate with other server computing environments (not shown in FIG. 8), third party service providers (not shown in FIG. 8), network attached storage ("NAS") and storage area networks ("SAN") to realize application/data transactions.

It should be appreciated that the computing architecture shown in FIG. 7 and the distributed network computing environment shown in FIG. 8 have been simplified for ease of discussion. It should also be appreciated that the computing architecture and the distributed computing network can include and utilize many more computing components, devices, software programs, networking devices, and other components not specifically described herein.

The present disclosure also encompasses the subject matter set forth in the following clauses:

Clause 1. A computer-implemented method, comprising: determining an interconnect topology for transmitting data between a plurality of graphical processing units (GPUs), the interconnect topology comprising an inter-GPU point-to-point topology and a shared interconnect topology; packing a quantity of directed spanning trees corresponding to the interconnect topology, the directed spanning trees comprising data defining communication links between the GPUs and an amount of the data to be transmitted on the communication links; and generating program code which, when executed, will cause the data to be transmitted between the GPUs based on the directed spanning trees Clause 2. The computer-implemented method of clause 1, wherein the quantity of directed spanning trees is selected to minimize the number of directed spanning trees and to maximize utilization of bandwidth available on the communication links.

Clause 3. The computer-implemented method of any of clauses 1-2, wherein the program code is configured to select a chunk size for chunks of the data to be transferred between the GPUs and to pipeline transmission of the chunks of the data between the GPUs.

Clause 4. The computer-implemented method of any of clauses 1-3, wherein the data comprises model parameters for a deep neural network (DNN) model.

Clause 5. The computer-implemented method of any of clauses 1-4, wherein the inter-GPU point-to-point topology comprises an NVIDIA NVLINK topology.

Clause 6. The computer-implemented method of any of clauses 1-5, wherein the shared interconnect topology comprises a Peripheral Component Interconnect Express (PCIe) topology.

Clause 7. The computer-implemented method of any of clauses 1-6, wherein the program code comprises Compute Unified Device Architecture (CUDA) program code.

Clause 8. A computer-readable storage medium having instructions stored thereupon which, when executed by a processor, cause the processor to: determine an interconnect topology for transmitting data between a plurality of graphical processing units (GPUs), the interconnect topology comprising an inter-GPU point-to-point topology; pack a quantity of directed spanning trees corresponding to the interconnect topology, the directed spanning trees comprising data defining communication links between the GPUs and an amount of the data to be transmitted on the communication links; and generate program code which, when executed, will cause the data to be transmitted between the GPUs based on the directed spanning trees.

Clause 9. The computer-readable storage medium of clause 8, wherein the interconnect topology further comprises a shared interconnect topology.

Clause 10. The computer-readable storage medium of any of clauses 8-9, wherein the inter-GPU point-to-point topology comprises an NVIDIA NVLINK topology and wherein the shared interconnect topology comprises a Peripheral Component Interconnect Express (PCIe) topology.

Clause 11. The computer-readable storage medium of any of clauses 8-10, wherein the quantity of directed spanning trees is selected to minimize the number of directed spanning trees and to maximize utilization of bandwidth available on the communication links.

Clause 12. The computer-readable storage medium of any of clauses 8-11, wherein the program code is configured to select a chunk size for chunks of the data to be transferred between the GPUs and to pipeline transmission of the chunks of the data between the GPUs.

Clause 13. The computer-readable storage medium of any of clauses 8-12, wherein the program code comprises Compute Unified Device Architecture (CUDA) program code.

Clause 14. The computer-readable storage medium of any of clauses 8-13, having further computer-executable instructions stored thereupon to execute the program code to transmit the data between the GPUs based on the directed spanning trees.

Clause 15. A computing system, comprising: a processor; and a computer-readable storage medium having instructions stored thereupon which, when executed by the processor, cause the processor to: determine an interconnect topology for transmitting data between a plurality of graphical processing units (GPUs), the interconnect topology comprising an inter-GPU point-to-point topology; pack a quantity of directed spanning trees corresponding to the interconnect topology, the directed spanning trees comprising data defining communication links between the GPUs and an amount of the data to be transmitted on the communication links; and generate program code which, when executed, will cause the data to be transmitted between the GPUs based on the directed spanning trees.

Clause 16. The computing system of clause 15, wherein the interconnect topology further comprises a shared interconnect topology, wherein the inter-GPU point-to-point topology comprises an NVIDIA NVLINK topology, and wherein the shared interconnect topology comprises a Peripheral Component Interconnect Express (PCIe) topology.

Clause 17. The computing system of any of clauses 15-16, wherein the quantity of directed spanning trees is selected to minimize the number of directed spanning trees and to maximize utilization of bandwidth available on the communication links.

Clause 18. The computing system of any of clauses 15-17, wherein the program code is configured to select a chunk size for chunks of the data to be transferred between the GPUs and to pipeline transmission of the chunks of the data between the GPUs.

Clause 19. The computing system of any of clauses 15-18, wherein the program code comprises Compute Unified Device Architecture (CUDA) program code.

Clause 20. The computing system of any of clauses 15-19, wherein the computer storage medium has further computer-executable instructions stored thereupon to execute the program code to transmit the data between the GPUs based on the directed spanning trees.

Based on the foregoing, it should be appreciated that technologies for mitigating communication bottlenecks during parameter exchange in data-parallel DNN training have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
   determining an interconnect topology for transmitting data between a plurality of graphical processing units (GPUs), the interconnect topology comprising an inter-GPU point-to-point topology and a shared interconnect topology;
   packing a quantity of directed spanning trees corresponding to the interconnect topology for transmitting the data between the plurality of GPUs, wherein the directed spanning trees comprise data defining communication links between the GPUs and an amount of the data to be transmitted on the communication links, and wherein the quantity of directed spanning trees is selected to minimize the number of directed spanning trees and to maximize utilization of bandwidth available on the communication links; and
   generating program code which, when executed, will cause the data to be transmitted between the GPUs based on the directed spanning trees, the program code configured to select a chunk size for chunks of the data to be transferred between the plurality of GPUs by testing throughput between the plurality of GPUs at a range of chunk sizes following a multiplicative increase, additive decrease scheme across iterations, and to pipeline transmission of the chunks of the data between the GPUs.

2. The computer-implemented method of claim 1, wherein multiplicative weight update (MWU) is utilized to select the quantity of directed spanning trees.

3. The computer-implemented method of claim 1, wherein the quantity of directed spanning trees is minimized utilizing an integer linear program (ILP).

4. A computer-readable storage medium having instructions stored thereupon which, when executed by a processor, cause the processor to:
   determine an interconnect topology for transmitting data between a plurality of graphical processing units (GPUs), the interconnect topology comprising an inter-GPU point-to-point topology and a shared interconnect topology;
   pack a quantity of directed spanning trees corresponding to the interconnect topology for transmitting the data between the plurality of GPUs, wherein the directed spanning trees comprise data defining communication links between the GPUs and an amount of the data to be transmitted on the communication links, and wherein the quantity of directed spanning trees is selected to minimize the number of directed spanning trees and to maximize utilization of bandwidth available on the communication links; and
   generate program code which, when executed, will cause the data to be transmitted between the GPUs based on the directed spanning trees, the program code configured to select a chunk size for chunks of the data to be transferred between the plurality of GPUs by testing throughput between the plurality of GPUs at a range of chunk sizes following a multiplicative increase, additive decrease scheme across iterations, and to pipeline transmission of the chunks of the data between the GPUs.

5. The computer-readable storage medium of claim 4, wherein multiplicative weight update (MWU) is utilized to select the quantity of directed spanning trees.

6. The computer-readable storage medium of claim 4, wherein the quantity of directed spanning trees is minimized utilizing an integer linear program (ILP).

7. A computing system, comprising:
   a processor; and a computer-readable storage medium having instructions stored thereupon which, when executed by the processor, cause the processor to:
   determine an interconnect topology for transmitting data between a plurality of graphical processing units (GPUs), the interconnect topology comprising an inter-GPU point-to-point topology and a shared interconnect topology;
   pack a quantity of directed spanning trees corresponding to the interconnect topology for transmitting the data between the plurality of GPUs, wherein the directed spanning trees comprise data defining communication links between the GPUs and an amount of the data to be transmitted on the communication links, and wherein the quantity of directed spanning trees is selected to minimize the number of directed spanning trees and to maximize utilization of bandwidth available on the communication links; and
   generate program code which, when executed, will cause the data to be transmitted between the GPUs based on the directed spanning trees, the program code configured to select a chunk size for chunks of the data to be transferred between the plurality of GPUs by testing throughput between the plurality of GPUs at a range of chunk sizes following a multiplicative increase, additive decrease scheme across iterations, and to pipeline transmission of the chunks of the data between the GPUs.

8. The computing system of claim 7, wherein multiplicative weight update (MWU) is utilized to select the quantity of directed spanning trees.

9. The computing system of claim 7, wherein the quantity of directed spanning trees is minimized utilizing an integer linear program (ILP).

* * * * *